United States Patent
Srinivasa et al.

(10) Patent No.: US 8,910,120 B2
(45) Date of Patent: Dec. 9, 2014

(54) SOFTWARE DEBUGGING RECOMMENDATIONS

(75) Inventors: Gopal Ranganatha Srinivasa, Bangalore (IN); Vipindeep Vangala, Hyderabad (IN); Balasubramanyan Ashok, Bangalore (IN); Sriram Rajamani, Bangalore (IN); Jacek Czerwonka, Sammamish, WA (US); Hongkang Liang, Sammamish, WA (US); Joseph M. Joy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 989 days.

(21) Appl. No.: 12/718,389

(22) Filed: Mar. 5, 2010

(65) Prior Publication Data

US 2011/0219360 A1  Sep. 8, 2011

(51) Int. Cl.
*G06F 9/44* (2006.01)
*G06F 17/30* (2006.01)

(52) U.S. Cl.
CPC . *G06F 9/44* (2013.01); *G06F 17/30* (2013.01)
USPC ............ 717/124; 717/127; 717/129; 717/131

(58) Field of Classification Search
CPC ... G06F 8/40; G06F 11/3688; G06F 11/3664; G06F 9/44589; G06F 17/30867; G06F 17/28; G06F 17/3053; G06F 17/30705; G06F 17/21; G06F 17/30598; G06F 17/3061; G06F 17/30619; G06F 17/30684
See application file for complete search history.

(56) References Cited

U.S. PATENT DOCUMENTS

| | | | |
|---|---|---|---|
| 6,721,941 B1* | 4/2004 | Morshed et al. | 717/127 |
| 6,978,441 B2* | 12/2005 | Atwood et al. | 717/125 |
| 7,117,483 B2 | 10/2006 | Dorr et al. | |
| 7,840,944 B2* | 11/2010 | Brunswig et al. | 717/124 |
| 7,904,461 B2* | 3/2011 | Baluja et al. | 707/749 |
| 8,079,019 B2* | 12/2011 | Lindo et al. | 717/129 |
| 2006/0004725 A1* | 1/2006 | Abraido-Fandino | 707/3 |
| 2006/0195822 A1* | 8/2006 | Beardslee et al. | 717/124 |
| 2007/0011659 A1* | 1/2007 | Venolia | 717/127 |
| 2007/0074149 A1* | 3/2007 | Ognev et al. | 717/101 |
| 2007/0168997 A1 | 7/2007 | Tran | |

(Continued)

OTHER PUBLICATIONS

Ismael Ciordia et al.; Bugzilla ITracker and Other Bug Trackers; 2005 IEEE; pp. 11-13; <http://ieeexplore.ieee.org/stamp/stamp.jsp?tp=&arnumber=1407819>.*

(Continued)

*Primary Examiner* — Thuy Dao
*Assistant Examiner* — Cuong V Luu
(74) *Attorney, Agent, or Firm* — Dan Choi; Judy Yee; Micky Minhas

(57) ABSTRACT

Software debugging recommendation technique embodiments are presented that generally entails creating a database of characterized software bug descriptions and providing software debugging recommendations from the database in response to a query. This can employ a two-phased approach in the search for similar software bugs. The first is a search phase that takes a query as input and returns a ranked list of software bug descriptions that match the query. These bug descriptions can contain a mix of structured and unstructured data. The second phase is a related-information phase that uses the output of the first phase to retrieve a set of related recommendations such as for people, source files, functions and binaries.

20 Claims, 10 Drawing Sheets

(56) References Cited

U.S. PATENT DOCUMENTS

| | | | |
|---|---|---|---|
| 2008/0275899 A1* | 11/2008 | Baluja et al. | 707/102 |
| 2011/0016456 A1* | 1/2011 | Artzi et al. | 717/131 |
| 2011/0016457 A1* | 1/2011 | Artzi et al. | 717/131 |
| 2011/0161938 A1* | 6/2011 | Marum et al. | 717/131 |
| 2013/0014084 A1* | 1/2013 | Sahibzada et al. | 717/124 |

OTHER PUBLICATIONS

D. Richard Kuhn et al.; An Investigation of the Applicability of Design of Experiments to Software Testing; 2003 IEEE; 5 pages; <http://ieeexplore.ieee.org/stamp/stamp.jsp?tp=&arnumber=1199454>.*

Michael Fischer et al.; Populating a Release History Database from Version Control and Bug Tracking Systems; 2003 IEEE; 10 pages; <http://ieeexplore.ieee.org/stamp/stamp.jsp?tp=&arnumber=1235403>.*

Cathrin Weiβ et al.; How Long will it Take to Fix This Bug; 2007 IEEE; 8 pages; <http://dl.acm.org/citation.cfm?id=1269017>.*

Andrew J. Ko et al.; A Linguistic Analysis of How People Describe Software Problems; 2006 IEEE; 8 pages; <http://ieeexplore.ieee.org/stamp/stamp.jsp?tp=&arnumber=1698774>.*

Andrew Begel et al.; Codebook Discovering and Exploiting Relationships in Software Repositories; 2010 ICSE; pp. 125-134; <http://ieeexplore.ieee.org/stamp/stamp.jsp?tp=&arnumber=6062080>.*

Bettenburg, N., R. Premraj, T. Zimmermann, S. Kim, Duplicate bug reports considered harmful . . . really?, 24th IEEE Int'l Conf. on Software Maintenance, ICSM 2008, Sep. 28-Oct. 4, 2008, pp. 337-345, Beijing, China.

Bettenburg, N., R. Premraj, T. Zimmermann, S. Kim, Extracting structural information from bug reports, Proc. of the 2008 Int'l Working Conf. on Mining Software Repositories, MSR 2008, May 10-11, 2008, pp. 27-30, Leipzig, Germany.

Bettenburg, N., S. Just, A. Schröter, C. Weiss, R. Premraj, T. Zimmermann, What makes a good bug report?, Proc. of the 16th ACM SIGSOFT Int'l Symposium on Foundations of Software Eng'g, Nov. 9-14, 2008, pp. 308-318, Atlanta, Georgia, USA.

Cottrell, R., J. J. C. Chang, R. J. Walker, J. Denzinger, Determining detailed structural correspondence for generalization tasks, Proc. of the 6th Joint Meeting of the European Software Eng'g Conf. and the ACM SIGSOFT Int'l Symposium on Foundations of Software Eng'g, 2007, Sep. 3-7, 2007, pp. 165-174, Dubrovnik, Croatia.

Cottrell, R., R. J. Walker, J. Denzinger, Jigsaw: a tool for the small-scale reuse of source code, pp. 933-934, 30th Int'l Conf. on Software Eng'g, ICSE 2008, May 10-18, 2008, Leipzig, Germany.

Čubranić, D., G. C. Murphy, J. Singer, K. S. Booth, Hipikat: A project memory for software development, IEEE Trans. Software Eng., Jun. 2005, pp. 446-465, vol. 31, No. 6.

Čubranić, D., G. C. Murphy, Hipikat: Recommending pertinent software development artifacts, Proc. of the 25th Int'l Conf. on Software Eng'g, ICSE 2003, May 3-10, 2003, pp. 408-418, Portland, Oregon, USA.

Gabel, M., L. Jiang, Z. Su, Scalable detection of semantic clones, 30th Int'l Conf. on Software Eng'g, ICSE 2008, May 10-18, 2008, pp. 321-330, Leipzig, Germany.

Gapeyev, V., F. Garillot, B. C. Pierce, Statically typed document transformation: An Xtatic experience, PLAN-X 2006 Informal Proceedings, Jan. 14, 2006, pp. 2-13, Charleston, South Carolina.

Jalbert, N., W. Weimer, Automated duplicate detection for bug tracking systems, Proc. of the 38th Annual IEEE/IFIP Int'l Conf. on Dependable Systems and Networks, DSN 2008, Jun. 24-27, 2008, Anchorage, Alaska, USA.

Kim, S., K. Pan, E. J. Whitehead Jr., Memories of bug fixes, Proc. of the 14th ACM SIGSOFT Int'l Symposium on Foundations of Software Eng'g, FSE 2006, Nov. 5-11, 2006, pp. 35-45, Portland, Oregon, USA.

Macromedia, Inc., ColdFusion MX 7—Controlling debugging information in CFML—Version 7, retrieved Nov. 9, 2009 from http://livedocs.adobe.com/coldfusion/7/htmldocs/00001218.htm, 1 page.

Microsoft, Corp., Collecting IntelliTrace information, retrieved Nov. 9, 2009, http://msdn.microsoft.com/en-us/library/dd264944(VS.100,printer).aspx, 3 pages.

Microsoft, Corp., Debugging with IntelliTrace, retrieved Nov. 9, 2009, http://msdn.microsoft.com/en-us/library/dd264915(VS.100,printer).aspx, 2 pages.

Neuhaus, S., T. Zimmermann, C. Holler, A. Zeller, Predicting vulnerable software components, Proc. of the 2007 ACM Conf. on Comp. and Communications Security, CCS 2007, Oct. 29-Nov. 2, 2007, pp. 529-540, Alexandria, Virginia, USA.

Runeson, P., M. Alexandersson, O. Nyholm, Detection of duplicate defect reports using natural language processing, 29th Int'l Conf. on Software Eng'g, ICSE 2007, May 20-26, 2007, pp. 499-510, Minneapolis, MN, USA.

Saul, Z. M., V. Filkov, P. T. Devanbu, C. Bird, Recommending random walks, Proc. of the 6th Joint Meeting of the European Software Eng'g Conf. and the ACM SIGSOFT Int'l Symposium on Foundations of Software Eng'g, Sep. 3-7, 2007, pp. 15-24, Dubrovnik, Croatia.

Tarvo, A., Using statistical models to predict software regressions, Proc. of the 19th Int'l Symposium of Software Reliability Eng'g, ISSRE 2008, Nov. 10-14, 2008, p. 259-264.

Theobald, M., J. Siddharth, A. Paepcke, SpotSigs: Robust and efficient near duplicate detection in large web collections, Proc. of the 31st Annual Int'l ACM SIGIR Conf. on Research and Development in Info. Retrieval, SIGIR 2008, Jul. 20-24, 2008, pp. 563-570, Singapore.

Tolmach, A. P., A. W. Appel, A debugger for standard ML, J. Funct. Program, Apr. 1995, pp. 155-200, vol. 5, No. 2.

Venolia, G., Textual allusions to artifacts in software-related repositories, Proc. of the 2006 Int'l Workshop on Mining Software Repositories, May 22-23, 2006, pp. 151-154, Shanghai, China.

Wang, X., L. Zhang, T. Xie, J. Anvik, J. Sun, An approach to detecting duplicate bug reports using natural language and execution information, 30th Int'l Conf. on Software Eng'g, ICSE 2008, May 10-18, 2008, pp. 461-470, Leipzig, Germany.

Zimmermann, T., P. Weiβgerber, S. Diehl, A. Zeller, Mining version histories to guide software changes, IEEE Trans. Software Eng., Jun. 2005, vol. 31, No. 6, pp. 429-445.

* cited by examiner

The customer experiences some deadlocks on a server. The problem is
random and may occur from several times a week to once a month. The
system looks hung because the global resource ObpInitKillMutant is
helped by a thread which tries to close a file forever. So all the processes
having a thread waiting on ObpInitKillMutant stop working. Drivers such
as TCP/IP continue to respond normally but it's impossible to connect to
any share.

Problem Impact: The impact is high since the servers have to be rebooted
when the problem occurs. As no one can connect to the server anymore
(net use), the production is down. The problem was first escalated as a
severity A.

```
..
0: kd> !thread 82807020
ChildEBP RetAddr Args to Child
80210000 80c7a028 80c7a068 ntkrnlmp!KiSwapThread+0x1b1
80c7a074 00000000 00000000 ntkrnlmp!KeWaitForSingleObject+0x1b8
80c7a028 00000000 00000000 ntkrnlmp!IopAcquireFileObjectLock+0x58
82a6d7a0 80c7a028 00120089 ntkrnlmp!IopCloseFile+0x79
82a6d7a0 80c7a010 80f6da40 ntkrnlmp!ObpDecrementHandleCount+0x112
00000324 7ffdef01 00000000 ntkrnlmp!NtClose+0x170
00000324 7ffdef01 00000000 ntkrnlmp!KiSystemService+0xc9
00000324 80159796 000000c9 ntkrnlmp!ZwClose+0xb
000000c9 e185f648 00000000 ntkrnlmp!ObDestroyHandleProcedure+0xd
809e3008 801388e4 82a6d926 ntkrnlmp!ExDestroyHandleTable+0x48
00000001 82a6d7a0 7ffde000 ntkrnlmp!ObKillProcess+0x44
00000001 82a6d7a0 82a6d7f0 ntkrnlmp!PspExitProcess+0x54
00000000 f0941f04 0012fa70 ntkrnlmp!PspExitThread+0x447
ffffffff 00000000 00002a60 ntkrnlmp!NtTerminateProcess+0x13c
ffffffff 00000000 00002a60 ntkrnlmp!KiSystemService+0xc9
00000000 00000000 00000000 NTDLL!NtTerminateProcess+0xb
```

FIG. 5

```
FAILURE_BUCKET_ID: 0x8E_CLASSPNP!TransferPktComplete+1f5
SYMBOL_NAME: CLASSPNP!TransferPktComplete+1f5
MODULE_NAME: CLASSPNP
IMAGE_NAME: CLASSPNP.SYS
FAILURE_BUCKET_ID: 0x8E_CLASSPNP!TransferPktComplete+1f5
BUCKET_ID: 0x8E_CLASSPNP!TransferPktComplete+1f5
```

FIG. 6

702 — Type BaseType = String
| Int

704 — Type NamedDoc = Value(BaseType)
| KeyValuePair(BaseType * Doc)

700 — Type Doc = Null
| Base(BaseType)
| Bag(NamedDoc set)
| Ordered(NamedDoc list)

706 — Type Doc = Bag( Base set)

FIG. 7

800 — q = Ordered([KiSwapThread, KeWaitForSingleObject, IopAcquireFileObjectLock, IopCloseFile])

802 — $d_1$ = Ordered([A, KiSwapThread, KeWaitForSingleObject,B])

804 — $d_2$ = Ordered([KiSwapThread, C, IopAcquireFileObjectLock,D])

806 — T(q) = {KiSwapThread, KeWaitForSingleObject, IopAcquireFileObjectLock, IopCloseFile
KiSwapThread_$%$_KeWaitForSingleObject,
KeWaitForSingleObject_$%$_IopAcquireFileObjectLock,
IopAcquireFileObjectLock_$%$_IopCloseFile }

808 — $T(d_1)$ = {A, KiSwapThread, KeWaitForSingleObject, B,
A_$%$_KeWaitForSingleObject
KiSwapThread_$%$_KeWaitForSingleObject,
B_$%$_KeWaitForSingleObject }

810 — $T(d_2)$ = {KiSwapThread, C, IopAcquireFileObjectLock, D,
KiSwapThread_$%$_C
C_$%$_IopAcquireFileObjectLock,
IopAcquireFileObjectLock_$%$_D }

FIG. 8

SOFTWARE DEBUGGING RECOMMENDATIONS

BACKGROUND

In software development projects, when programmers are assigned a software bug to fix, they typically spend significant time during diagnosis searching for instances from the past where similar bugs have been debugged, analyzed and resolved. They often search through software bug databases, articles from the on-line developer networks, email threads, logs of debugging sessions, crash logs, event traces or other sources, and/or talk to colleagues to find this information. For example, the same software bug or a very similar bug may have been encountered and fixed in another code branch, and a programmer would greatly benefit from knowing this information.

SUMMARY

The software debugging recommendation technique embodiments described herein facilitate the software debugging procedure by automating the search for similar issues from the past. In general, this entails creating a database of characterized software bug descriptions and providing software debugging recommendations from the database in response to a query.

In one implementation, a software bug description database is created by first inputting a software bug description which provides information about a previously resolved or yet to be resolved software bug occurring in a software program. A group of software-specific feature extractors is then employed. Each extractor recognizes and extracts a different feature from the software bug description whenever the feature exists therein. A typed document is generated from the features extracted by the feature extractors, and then transformed into a bag of words. The bag of words is stored in the software bug database. This procedure is then repeated for additional software bug descriptions associated with previously resolved or yet to be resolved software bugs, or both, that occurred in the software program, and that it is desired to include in the database. Once all the software bug descriptions have been processed, a full-text searchable index of the bags of words representing the software bug descriptions in the database is generated.

As for providing software debugging recommendations, in one implementation, a software bug description query is input which provides information about an unresolved software bug occurring in a software program covered in the previously constructed database. The same group of software-specific feature extractors that were used in constructing the database is then employed. Each extractor recognizes and extracts a different feature from the software bug description query if the feature exists therein. A typed document is generated from the features extracted from the software bug description query by the feature extractors, and then transformed into a bag of words. The aforementioned index associated with the software bug database is searched to identify one or more software bug descriptions deemed to be similar to a prescribed degree to the software bug description query. The result of the search is to produce a list of the identified software bug descriptions in the database that are deemed to be similar to the software bug description query.

The software debugging recommendation technique embodiments described herein can also include a second phase. The second phase uses the results of the above-described search to retrieve related contextually relevant information. For example, this information can include a set of recommendations for people, source files, functions and binaries related to the identified software bug descriptions in the database that are deemed to be similar to the software bug description query.

It should also be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

FIG. 5 is an exemplary representation of a portion of a software bug description having structured and unstructured parts.

FIG. 6 is an exemplary representation of a portion of a software bug description that includes several attribute and value combinations.

FIG. 7 is an exemplary specification of a typed document.

FIG. 8 is an example of the Score function and the transformation T using the small ordered list.

DETAILED DESCRIPTION

Figure 1:
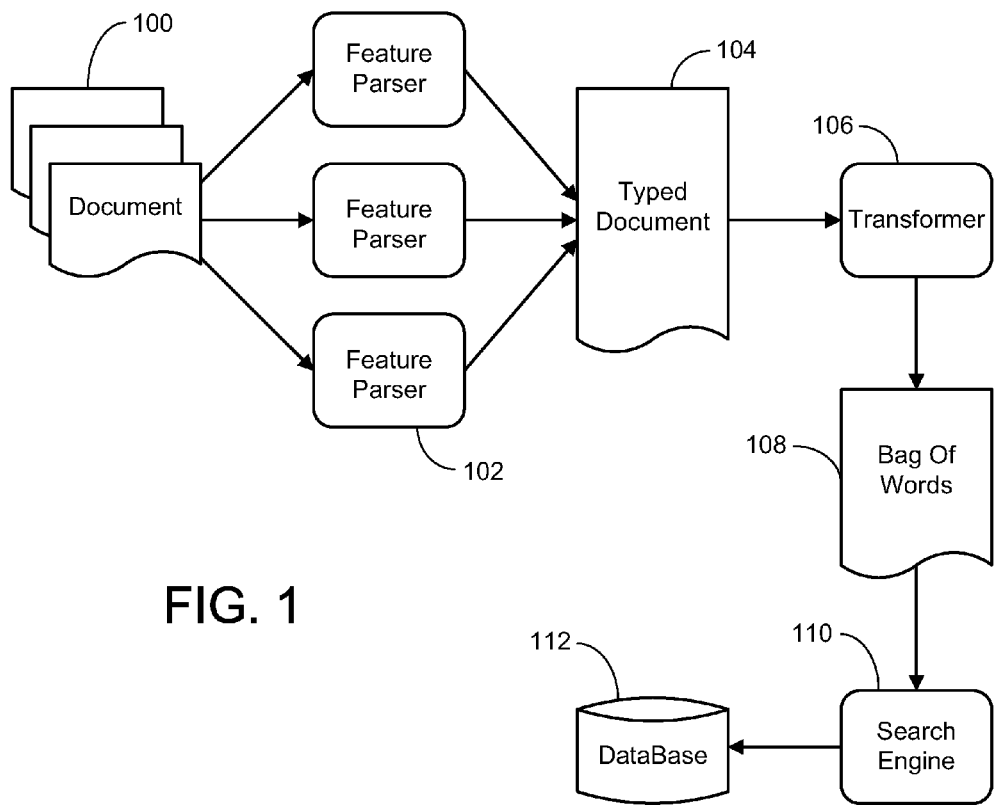
FIG. 1 is a diagram depicting an exemplary architectural used for constructing a software bug description database.

In the following description of software debugging recommendation technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Software Debugging Recommendation

In general, the software debugging recommendation technique embodiments described herein improve the productivity of a debugging procedure by automating the search for similar issues from the past. Knowledge of how a similar software bug was handled previously can be invaluable to a programmer who is attempting to fix a current bug.

Automating the search for similar software bugs encountered in the past, first involves understanding what constitutes a query. In principle, it is desirable to leverage all of the knowledge the user has on the current bug. This information is referred to as the context of the software bug, and can include natural language text, textual rendering of core dumps, debugger output, and so on. For example, the context may include the state of the machine being debugged, information in the current bug report, and information obtained from the user's interaction with the debugger, among other items.

The software debugging recommendation technique embodiments described herein allow a software programmer to express a portion or the entire context of a software bug as the query, and then search through diverse data repositories to greatly improve the productivity of the debugging process. While satisfactory results can be obtained when a programmer employs short queries, the full advantages of the recommendation technique embodiments described herein are realized when large portions (or all) the context of a bug are used as the query. When large portions (or all) of the context are employed, the query can be referred to as a fat query, which could be kilobytes of structured and unstructured data describing the contextual information for the software bug. The use of a fat query allows a programmer to query the data repositories with a single query rather than having to search through each data repository separately using several short query string queries. In addition, combined search results are automatically produced.

As for the aforementioned variegated data repositories, these can contain a mix of structured and unstructured data and provide a diversity of information sources that contain potentially useful information for the user. Examples of data repositories include past bug reports, logs of interactive debugger sessions, information on related source code changes, and information about people who can be consulted.

The software debugging recommendation technique embodiments described herein generally employ a two-phased approach in the search for similar software bugs. The first is a search phase that takes a query as input and returns a ranked list of software bug descriptions that match the query. These bug descriptions (which will be referred to as documents in FIG. 1) can contain a mix of structured and unstructured data. In general, the software bug descriptions can any useful information associated with a software bug such as developer network data, e-mails, debug logs, any software-related document, Information from logs of debugging sessions of previous bugs, and more. The second phase is a related-information phase that uses the output of the first phase to retrieve a set of related recommendations such as people, source files, functions and binaries. These two phases will be described more fully in the sections to follow.

1.1 The First Phase

The first phase of the software debugging recommendation technique embodiments described herein matches software bug descriptions that at are similar to a query software bug description. It is noted that like the software bug descriptions themselves, the software bug query can be any useful information associated with a software bug. Generally, this is accomplished by uniformly representing both queries and information sources as a collection of features, which are then formalized as categorized software bug descriptions (which will be referred to as typed documents in FIG. 1). Typed documents represent software specific structure in a way that it can be transformed to allow the use of generic index and search infrastructures. In general, a typed document is one that is categorized using a type constructor, where the type constructor defines how two instances of such a document are compared. In one implementation, typed documents have a recursive structure with four type constructors: (1) unordered bag of terms; (2) ordered list of terms; (3) weighted terms; and (4) key-value pairs. For example, in one tested implementation, the following four features were employed: (1) bag of interesting words, such as "impersonating", "exclusive", "deadlock", "hang", "overflow", "multicore", and so on (represented as an unordered bag of terms); (2) debug commands issued with their output results from a debugger (represented as bag of key-value pairs), (3) values of attributes such as CURRENT_IRQL, PROCESS_NAME, MODULE_NAME, BUCKET_ID, and so on (represented as bag of key-value pairs), and (4) stack frame (represented as an ordered list of terms). No weighted terms were employed in this example. Features with arbitrary structure are expressed by combining two or more of the foregoing type constructors. It is noted that additional types and transformations can also be defined as desired.

Representing features as typed documents leads to an advantage as it separates the process of defining and extracting software-specific structure from the process of indexing and searching. The former is accomplished with the aid of an expert in the software being considered, but the latter can be done generically from the type structure. It is noted that the aforementioned expert is sometimes referred to as a domain expert.

1.1.1 Software Bug Description Database Construction

Prior to being able to input a software bug query and produce a ranked list of software bug descriptions that match the query, a database of similarly characterized software bug descriptions is first constructed. Referring to FIG. 1, one implementation of a database construction architecture includes a series of documents 100 representing previously known software bugs (which can be resolved and/or yet to be resolved). Each document 100 is input to and analyzed using a group of feature parsers 102. There is one feature parser 102 for each feature (e.g., a call stack) deemed by a domain expert to be indicative of the software being categorized. It is noted that while three feature parsers 102 are shown in FIG. 1, there can be less or more depending on the software. The output of the group of feature parsers is combined to create the aforementioned typed document 104. The typed document is then processed by a transformer 106, which converts it into a bag of words 108. As will be described in more detail later, the transformer 106 operates in such a way as to encode the semantics of the type structure of the typed document. The bag of words 108 generated for each document is then stored in a database 112 after being indexed by an appropriate search engine 110. For example, a search engine based on TF-IDF (Term Frequency and Inverse Document Frequency) would be an appropriate choice.

Figure 2:
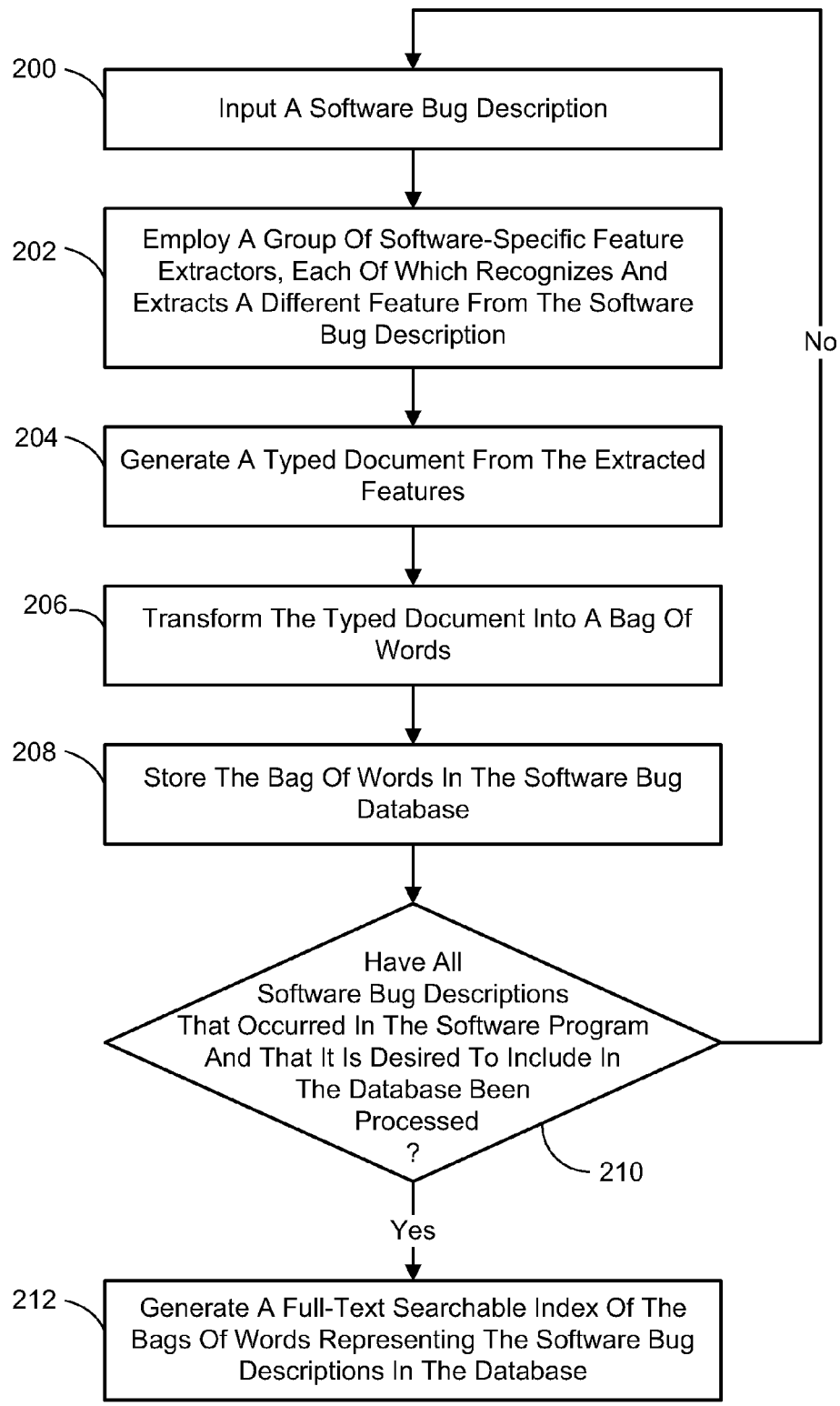
FIG. 2 is a flow diagram that generally outlines one implementation of a computer-implemented process for creating a database of characterized software bug descriptions.

The foregoing database construction architecture can be realized in one implementation using the following process, as illustrated in FIG. 2. In this exemplary process, a computer (such as one of the computing devices described in the Computing Environment section provided later in this specification) is employed to perform a series of process actions including inputting a software bug description which provides information about a previously resolved or yet to be resolved software bug occurring in a software program of interest (200). A group of software-specific feature extractors designed for the software program is then employed, where each extractor recognizes and extracts a different feature from the software bug description whenever the feature exists therein (202). A typed document is generated from the features extracted by the feature extractors (204), and then transformed into a bag of words (206). The bag of words is stored in a software bug database (208). It is next determined if all the software bug descriptions associated with previously resolved or yet to be resolved software bugs, or both, that occurred in the software program and that it is desired to include in the database, have been processed (210). If not, then process actions (200) through (210) are repeated for each additional software bug description. Once all the software bug descriptions have been processed, a full-text searchable index of the bags of words representing the first-input and additional software bug descriptions in the database is generated (212).

The software bug description database storing a separate bag of words representation for each of the input software bug descriptions (i.e., documents) serves as the source for finding similar software bug descriptions in a search, as will now be described.

1.1.2 Searching

Figure 3:
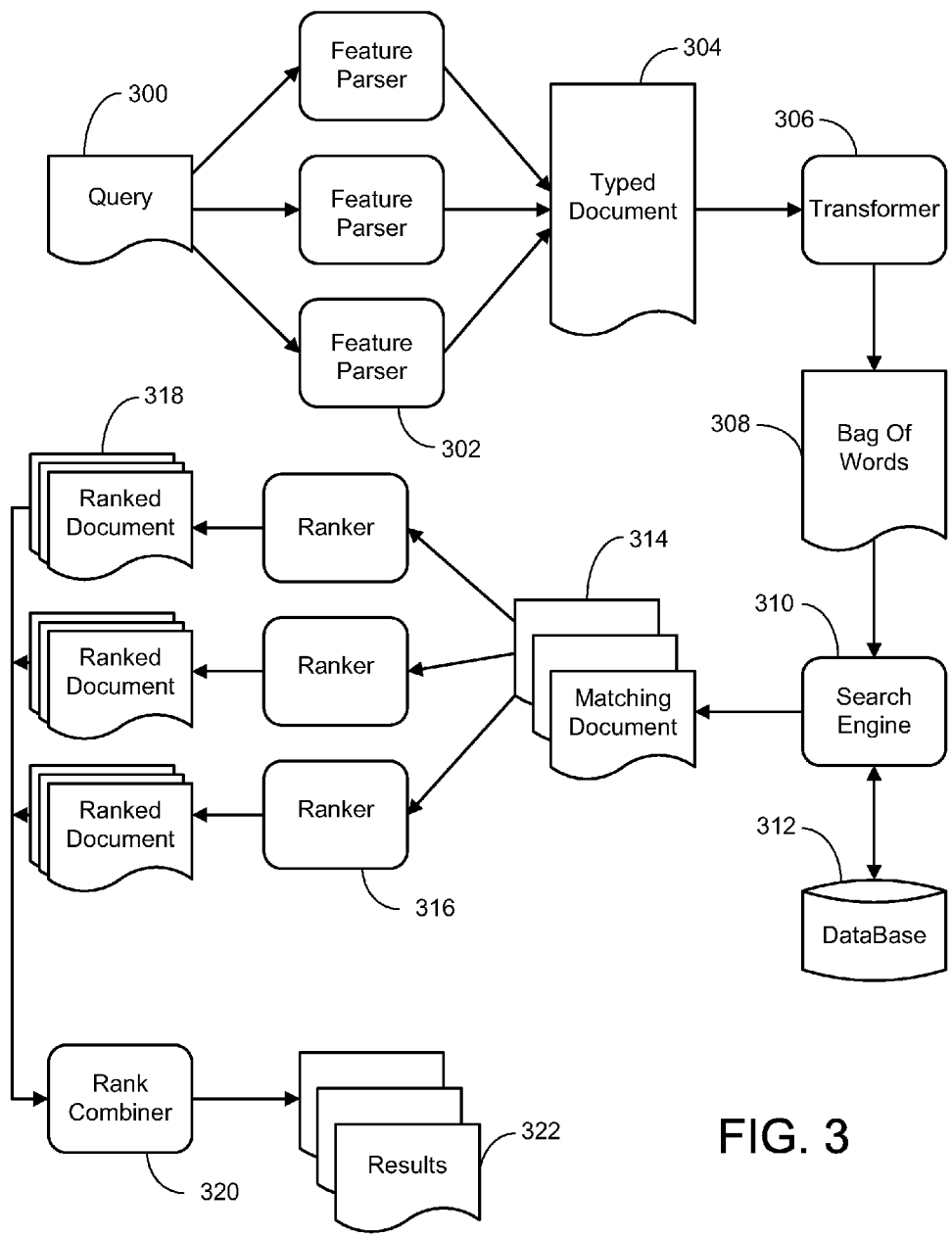
FIG. 3 is a diagram depicting an exemplary architectural used for searching a software bug description database to obtain software debugging recommendations.

Referring to FIG. 3, in one implementation of a searching architecture, an input query 300 (e.g., a fat query) is processed in a similar manner as the aforementioned documents in that it is first analyzed using a group of feature parsers 302 that are identical to those used to analyze the documents. The output of the feature parsers 302 is combined to produce a typed document 304, which is then processed using the same transform 306 to produce a bag of words 308. The aforementioned search engine 310 is then used to find documents 314 matching the query 300 in the previously-constructed software bug description database 312.

In one embodiment, the matching documents 314 are then each analyzed by a group of customer rankers 316 that are each designed by a domain expert to rank the documents according to a specific feature deemed important. It is noted that while three rankers 316 are shown in FIG. 3, there can be less or more depending on the software. This produces a set of ranked matching documents 318 from each of the custom rankers 316. These lists of ranked documents 318 are combined using a rank combiner 320 and conventional methods to produce a single set of ranked search results 322 of the documents matching the query.

Figure 4A:
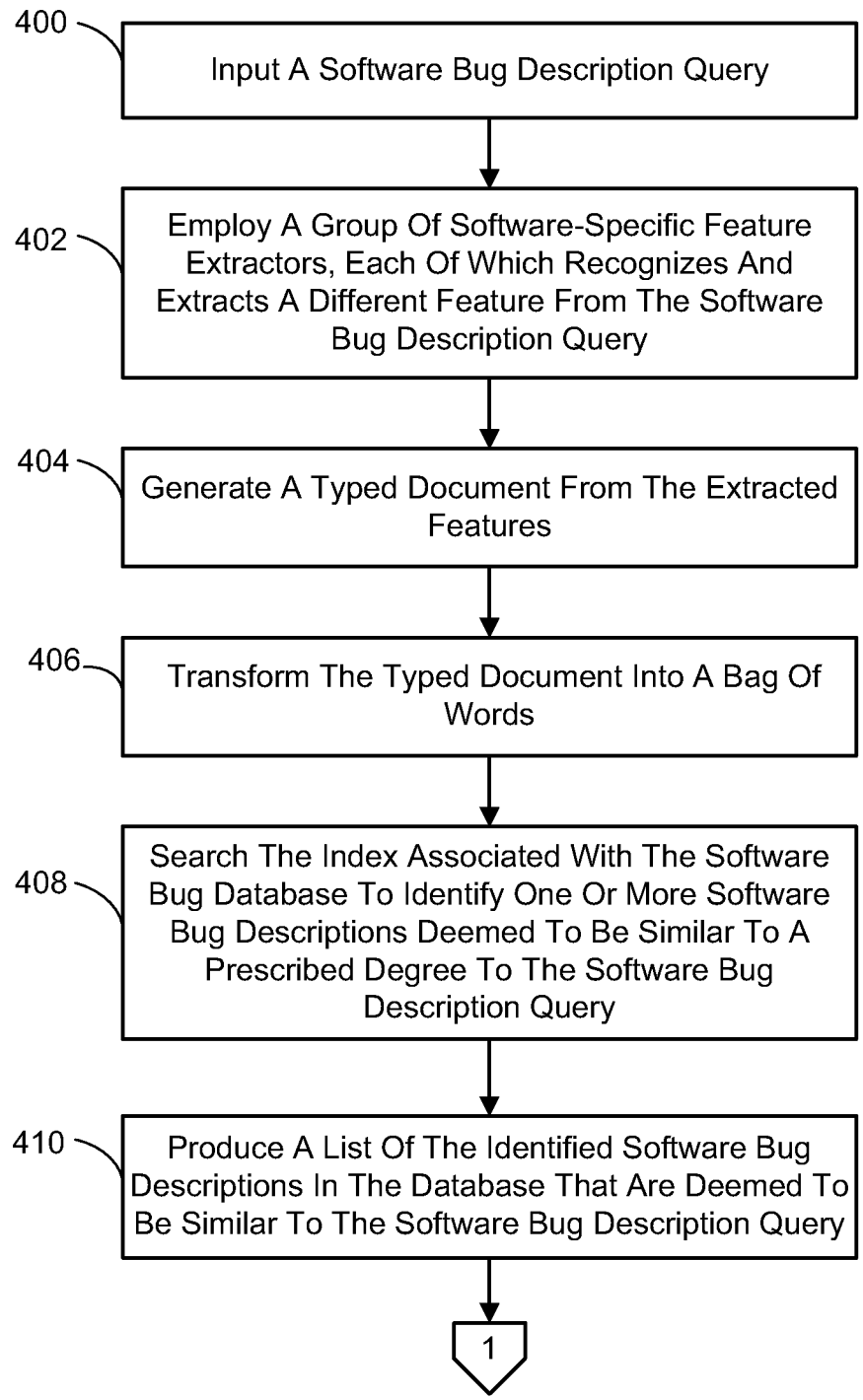
FIGS. 4A-B depict a flow diagram that generally outlines one implementation of a computer-implemented process for providing software debugging recommendations.
Figure 4B:
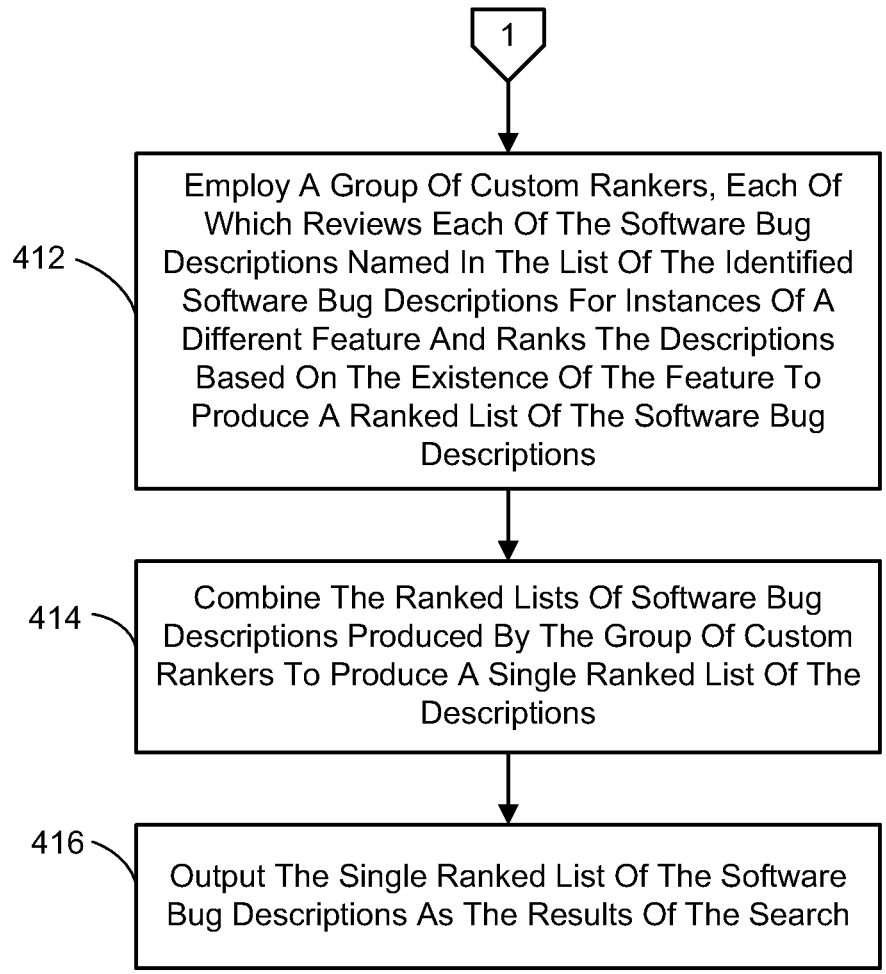

The foregoing searching architecture can be realized in one implementation using the following process, as illustrated in FIGS. 4A-B. In this exemplary process, a computer (such as one of the computing devices described in the Computing Environment section provided later in this specification) is employed to perform a series of process actions including inputting a software bug description query which provides information about an unresolved software bug occurring in a software program covered in the previously constructed database (400). A group of software-specific feature extractors designed for the software program (and which were used in constructing the database) is then employed, where each extractor recognizes and extracts a different feature from the software bug description query whenever the feature exists therein (402). A typed document is generated from the features extracted from the software bug description query by the feature extractors (404), and then transformed into a bag of words (406). The aforementioned index associated with the software bug database is searched to identify one or more software bug descriptions deemed to be similar to a prescribed degree to the software bug description query (408). As described previously, each software bug description in the database provides information about a previously resolved or yet to be resolved software bug occurring in the software program associated with the software bug description query, and each has been transformed into a bag of words in the same manner as the software bug description query. The result of the search is to produce a list of the identified software bug descriptions in the database that are deemed to be similar to the software bug description query (410).

The search results can then be ranked if desired as shown in the exemplary process of FIG. 4B. More particularly, a group of custom rankers is employed, where each ranker reviews each of the software bug descriptions named in the list of the identified software bug descriptions for instances of a different feature and ranks the descriptions based on the existence of the feature to produce a ranked list of the software bug descriptions (412). The ranked lists of software bug descriptions produced by the group of custom rankers are combined to produce a single ranked list of the descriptions (414). This single ranked list of the software bug descriptions is then output as the results of the search (416).

1.1.3 Features

Consider the exemplary portion of a software bug description illustrated in FIG. 5. This excerpt contains two parts. The first part 500 is natural language text. It mentions that the problem is a "deadlock", and names an object ObpinitKillMutant, which is a semaphore on which threads are blocked. The second part 502 is an extract from a call stack of one thread. The first part 500 is unstructured and the second part 502 has some structure.

Suppose it is desired to search for similar software bug descriptions in a database. For this purpose, the first and second parts 500, 502 need to be treated differently. The first part 500 can be handled using full text search, since it has no structure. For the second part 502, it is advantageous to match other software bug descriptions whose call stacks are similar to the call stack in FIG. 5. The definition of a "similarity" between stacks is very particular and specific to the software (i.e., domain specific). The actual addresses in the call stack are not important for similarity—thus the first three columns in the stack trace can be ignored. However, two stacks are similar if they have the same functions in the same order. Thus, for the bug description in FIG. 5, the function names such as ObpDecrementHandleCount, ZwClose, ObpDestroyHandleProcedure, ExDestroyHandleTable, ObKillProcess, and the order in which they appear, are used for determining similarity with respect to other call stacks.

Sometimes software bug descriptions include several attributes and values, as shown in FIG. 6. In such situations, the association between the attribute and value is useful when determining similarity between two bug reports. For instance, a bug report with an attribute IMAGE_NAME having the value CLASSPNP.SYS is more similar to the bug report in FIG. 6, than another report that has both the terms IMAGE_NAME and CLASSPNP.SYS at different parts of the document, but which are not related together as an attribute-value pair.

Call stacks and image names are just two examples of features in software bug descriptions. There are several other features such as semaphores, mutexes, memory dumps, exceptions, and so on. Each of these has their own software-specific notions of similarity.

1.1.4 Typed Documents and Similarity

An exemplary specification of a typed document is illustrated in FIG. 7. This specification employs a ML-style syntax. A document Doc 700 is one of (1) a null document, (2)

base type (integer or string) 702, (3) a bag of named documents (which is an unordered set), or (4) an ordered list of named documents. A named document NamedDoc 704 is either a value of base type or a key-value pair having a key (of base type) and a value (of document type).

It is desired to define and implement a similarity metric between typed documents represented by the type Doc 700. In contrast with typed documents, full-text search can be thought of as implementing a similarity metric between a less expressive type structure, namely a bag of terms. More precisely, a full-text search engine operates over the (impoverished) type structure $\overline{\text{Doc}}$ 706 from FIG. 7. A full-text search engine implements retrieval based on a score function $\overline{\text{Score}}$:( $\overline{\text{Doc}} \times \overline{\text{Doc}}) \to \text{Int}$, where $\overline{\text{Score}}$ (Bag(q); Bag(d)) is given by the nested sum $\Sigma_{t \in q} \Sigma_{s \in d}$ (if (t=s) then 1 else 0).

Note that the grammar for typed documents forces the occurrence of a key at each level of the recursive type structure. In the description to follow, it is assumed that each key occurs only once in a type definition. Thus, each sub-document of a document can be uniquely scoped using a sequence of keys used to reach the sub-document from the root. A function Score: Doc×Doc→Int is defined that maps a pair of documents to an integer score. Intuitively, Score(q, d) is a measure of the similarity between q and d. The more similar q and d are, the higher the value of Score(q, d). Score is defined inductively over the type structure of its arguments as follows:

$$\text{Score}(\text{Base}(q), \text{Base}(d)) = \text{if}(q=d) \text{then } 1 \text{ else } 0 \quad (1)$$

$$\text{Score}(\text{Bag}(q), \text{Bag}(d)) = \Sigma_{s \in q} \Sigma_{t \in d} \text{Match}(s,t) \quad (2)$$

$$\text{Score}(\text{Ordered}(q), \text{Ordered}(d)) = \Sigma_{n \in \{1,2\}} \Sigma_{t \in \text{NGram}(q,n)} \Sigma_{s \in \text{NGram}(d,n)} \text{NGramMatch}(s,t,n) \quad (3)$$

Thus, if the documents q and d are base type expressions, then Score is defined to be 1 if they are identical and 0 if they are not identical. If the first two arguments to Score are bags of documents, then Score (Bag(q); Bag(d)) is defined to be sum of the scores of matching the elements of q and d. If the first two arguments to Score are ordered lists of documents, then an n-gram of a sequence q is a contiguous sub-sequence of q of length n. NGram(q, n) is set of all n-grams of a sequence q. Accordingly, Score(Ordered(q), Ordered(d)) is the sum of the scores of matching n-grams for q and d. In practice, n-grams are considered for values of n equal to 1 (unigrams) and 2 (bigrams).

An auxiliary function Match: NamedDoc× NamedDoc→Int is defined as follows:

$$\text{Match}(\text{Value}(t), \text{Value}(t')) = \text{Score}(\text{Base}(t), \text{Base}(t')) \quad (4)$$

$$\text{Match}(\text{KeyValuePair}(k_1, v_1), \text{KeyValuePair}(k_2, v_2)) = \text{if } (k_1 = k_2) \text{then Score}(v_1, v_2) \text{else } 0 \quad (5)$$

$$\text{NGramMatch}(s,t,n) = \Pi_{i=1 \ldots n} \text{Match}(s_i, t_i) \quad (6)$$

Thus, Match returns the score of base types if the arguments are values. If the arguments are key-value pairs, Match returns the score between the values of the two documents if the keys are equal, and 0 otherwise.

It is assumed here implicitly that the type structure of the query and document match. For parts of the parse tree that do not match Score is implicitly defined to be 0. For instance, Match(Value(t), KeyValuePair(k, v)) is 0 since it does not match any of the templates given in Eqs. (1)-(6).

In addition to the constructors shown in FIG. 7, queries also allow annotating arbitrary sub-trees with integer weights. That is, queries can contain another constructor WeightedQuery(Int*Doc), and the Score function is extended as:

$$\text{Score}(\text{WeightedQuery}(w,q),d) = w \times \text{Score}(q,d). \quad (7)$$

This allows the features to be written in such a way that more weight is given to matching certain parts of the query (such as call stacks).

1.1.5 Transformation

In one implementation of the software debugging recommendation technique embodiments described herein, determining similarity between typed documents is accomplished by leveraging existing search engine technology. In this way, any full-text search engine can be used as a subroutine for indexing and searching typed documents, thereby taking advantage of the enormous amount of progress that has been made in this field over the past decade.

More particularly, a transformation is employed to implement the previously-described score function Score: Doc× Doc→Int using the score function $\overline{\text{Score}}$:($\overline{\text{Doc}} \times \overline{\text{Doc}}$)→Int. Given the transformation T: Doc→$\overline{\text{Doc}}$ such that for any two typed documents $d_1$ and $d_2$, $\overline{\text{Score}}$(T ($d_1$),T ($d_2$)) is equal to Score($d_1$, $d_2$). Intuitively, T(d) walks the parse tree of the typed document d and transforms every internal node to a bag of words (where each word belongs to the base type). The transformation T is defined as follows:

$$T(\text{Null}) = \{\} \quad (8)$$

$$T(\text{Base}(x)) = \{x\} \quad (9)$$

$$T(\text{Bag}(\{v_1, v_2, \ldots, v_n\})) = \circledR_{1 \leq i \leq n} N(v_i) \quad (10)$$

$$\begin{aligned}(\text{Ordered}(\{v_1, v_2, \ldots, v_n\})) &= \circledR_{1 \leq i \leq n} N(v_i) \circledR_{1 \leq i \leq (n-1)} \\ &\quad \text{Join}(N(v_i), N(v_{i+1}))\end{aligned} \quad (11)$$

$$N(\text{Value}(x)) = \{x\} \quad (12)$$

$$N(\text{KeyValuePair}(k,x)) = \text{Prefix}(k, T(x)) \quad (13)$$

$$\text{Prefix}(s, X) = \{s \# x | x^{\text{TM}} X\} \quad (14)$$

$$\text{Join}(X, Y) = \{x \# y | x^{\text{TM}} X, y^{\text{TM}} Y\} \quad (15)$$

$$x \# y = x \circ \text{``\_\$\%\$\_''} \circ y, \text{ where } \circ \text{ denotes string concatenation} \quad (16)$$

It is noted that even though set notation is used to represent bags of words, these bags differ from sets in that the same element can occur more than once. Thus {a, b, a} is a bag and is identical to {a, a, b}—the ordering of elements is irrelevant. Also note that the symbol ⓡ is used to denote a union operator on bags. Given two bags $b_1$ and $b_2$, $b_1$ ⓡ $b_2$ contains all the elements in $b_1$ together with all the elements in $b_2$. If an element e appears $n_1$ times in $b_1$ and $n_2$ times in $b_2$, then e appears ($n_1 + n_2$) times in $b_1$ ⓡ $b_2$.

For a document equal to Null, T (Null) is the empty bag denoted by { } as indicated in Eq. (8). For a document of the form Base(x), T (Base(x)) is given by the bag {x}, which contains one element, namely x as indicated in Eq. (9). For a document of the form (Bag({$v_1, v_2, \ldots, v_n$}), T (Bag({$v_1, v_2, \ldots, v_n$})) is given by the union of the bags obtained by transforming each of $v_1, v_2, \ldots, v_n$ using N as indicated in Eq. (10). The function N:Name d Doc→$\overline{\text{Doc}}$ maps named documents to bags of words. If a named document is of the form KeyValuePair(k, x), N(KeyValuePair(k, x)) is obtained by concatenating the prefix k and a character sequence, say "$%$", to every element in T(x) as indicated in Eq. (13). It is assumed that the special character sequence "$%$" does not appear anywhere in the original typed document. To see the rationale for this prefix operation, recall the definition of Match(KeyValuePair($k_1, v_1$), KeyValuePair($k_2, v_2$), c) from Eq. (5). Match evaluates to 0 if the keys $k_1$ and $k_2$ do not match, and evaluates to Score($v_1$, $v_2$, c#k1) otherwise. Prefixing k to every element in T(x) has an identical effect during the computation of $\overline{Score}$ on the transformed document.

For a document of the form (Ordered($\{v_1, v_2, \ldots, v_n\}$)), T (Ordered($\{v_1, v_2, \ldots, v_n\}$)) is given by the union of the bags obtained by transforming each of the unigrams $v_1, v_2, \ldots, v_n$ using N, as well as the union of bigrams obtained by joining every successive pair of transformed $v_i$'s using the operator Join, as indicated in Eq. (11). The operator Join(X,Y) obtains a cross product of terms in the two bags X and Y, as indicated in Eq. (15). To see the rationale for the join operation recall the definition Score(Ordered(q), Ordered(d), c) from Eq. (3). Note that the definition of Score(Ordered(q), Ordered(d), c) sums up the scores of all matching unigrams and bigrams of q and d.

Score and $\overline{Score}$ can be related using a inductively provable theorem that for any two typed documents q and d, Score(q, d) is equal to $\overline{Score}$(T(q),T(d)). More particularly, this theorem can be established by induction over the type structure of typed documents using the following example. Consider a section of the call stack from FIG. 5. The feature parser for a call stack extracts the ordered list Ordered([ntkrnlmp!KiSwapThread, ntkrnlmp?KeWaitForSingleObject, . . . , ntkrnlmp!TerminateProcess]) as a typed document representing the feature. Note that the feature parser trims memory address values and suffixes such as "+x0x1b1" from each stack frame and retains only the function name.

In this example, the Score function and the transformation T will be illustrated using the smaller ordered list shown in FIG. 8. Suppose, there are typed documents representing a query q 800 and two bug descriptions $d_1$ 802 and $d_2$ 804, as shown in FIG. 8. Score(q, $d_1$, ƒ)=3, since q 800 and $d_1$ 802 have two matching unigrams, namely [KiSwapThread] and [KeWaitForSingleObject], as well as one matching bigram, namely [KiSwapThread, KeWaitForSingleObject]. In addition, Score(q, $d_2$, ƒ)=2, since q 800 and $d_2$ 804 have two matching unigrams—namely [KiSwapThread] and [IopAcquireFileObjectLock]. This matches the intent that q 800 is more similar to $d_1$ 802 than to $d_2$ 804 since there are two contiguous function names KiSwapThread and KeWaitForSingleObject that match between q and $d_1$. On the other hand, if q, $d_1$ and $d_2$ are instead treated as bags of words, then Score(q, $d_1$, ƒ)=Score(q, $d_2$, ƒ)=2, and the ordering and sequencing of words will not be taken into account.

FIG. 8 also shows the values of T(q) 806, T($d_1$) 808 and T($d_2$) 810. Assuming a constant inverse document frequency (IDF) of 1, $\overline{Score}$(T(q),T($d_1$))=3 since T(q) 806 and T($d_1$) 808 have three terms in common, namely KiSwapThread, KeWaitForSingleObject, and KiSwapThread_$%$_KeWaitForSingleObject. Additionally, $\overline{Score}$(T(q),T($d_2$))=2 since T(q) 806 and T($d_2$) 810 have two terms in common, namely KiSwapThread, and IopAcquireFileObjectLock. Recalling the values of Score(q, $d_1$, ƒ) and Score(q, $d_2$, ƒ) it is noted that Score(q, $d_1$, ƒ)=$\overline{Score}$(T(q),T($d_1$))=3, and Score(q, $d_2$, ƒ)=$\overline{Score}$(T(q),T($d_2$))=2.

1.1.6 Term Frequency and Inverse Document Frequency

It is noted that in the foregoing description of Score and $\overline{Score}$ matches among all terms are weighted equally. However, in practice, search engines often weight terms in a manner inversely proportional to the frequency with which they occur in the corpus. This has the effect of weighting matches on infrequently occurring terms higher than matches on frequently occurring terms. More particularly, $\overline{Score}$(Bag(q), Bag(d)) is given by the nested sum $\Sigma_{t \in q} \Sigma_{s \in d}$ (if (t=s) then IDF(t) else 0). Here, note that IDF(t) is equal to $$\log \frac{N}{DF(t)},$$

where N is the number of documents in the corpus and DF(t) is the number of times term t appears in the corpus.

1.1.7 Implementation Details

In one implementation of the software debugging recommendation technique embodiments described herein, T is accomplished in the C# programming language using a visitor that walks over the parse tree of features (see the transform elements 106 and 306 of FIGS. 1 and 3). The software bug descriptions (i.e., documents) come from a variety of sources. There are two kinds of documents that are indexed for the first phase—namely: (1) software bug records from the software bug databases, and (2) debug logs produced from actual debugging sessions.

1.2 The Second Phase

The first phase generally involved using typed documents to represent structure in fat queries and documents (bug descriptions and associated data). These typed documents are used to encode software-specific similarity information and are generically transformed into bags of words so that they can be indexed and searched using existing search engines. The result of the first phase is a list of software bug descriptions that match a query software bug description. In the second phase, which will now be described, probabilistic inference is used to generate a ranked list of people, source files, functions and binaries related to the aforementioned query. While the second phase is optional, it is believed that the additional information over and above the similar software bug descriptions found in the first phase will aid the programmer in resolving a current software bug.

Figure 9:
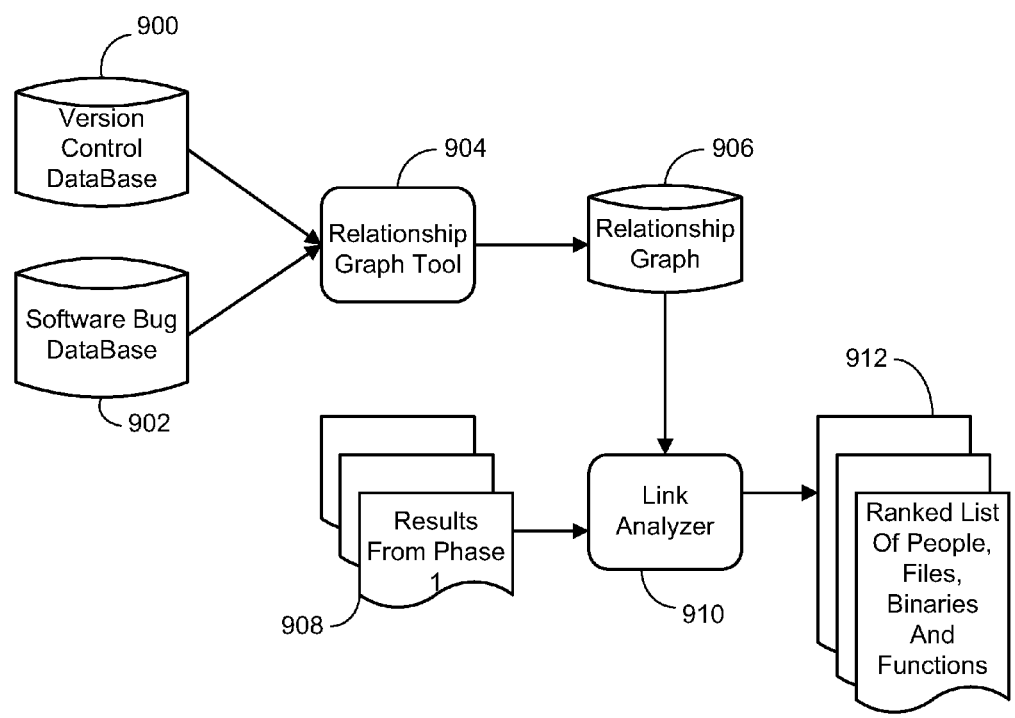
FIG. 9 is a diagram depicting an exemplary architectural used for implementing the second phase of the software debugging recommendation technique embodiments described herein which generally retrieves recommendations about people, source files, binaries, and source functions that are relevant to the current query.

The aforementioned second phase of the software debugging recommendation technique embodiments described herein generally retrieves recommendations about people, source files, binaries, and source functions that are relevant to the current query, by analyzing relationships between these entities. For instance, referring the exemplary architecture depicted in FIG. 9, in the case of a previously resolved software bug, in one implementation it is possible to discover the version control revision that was made to fix the bug from a version control database 900. It is also possible to find out which lines of code were changed to fix the bug, which functions and which binaries were changed, and who made the change from a software bug database 902. A relationship graph tool 904 uses this information to produce a relationship graph 906, which relates elements in bug descriptions, source files, functions, binaries and people. Starting with a "seed" set of software bug descriptions 908 from the first phase, a link analyzer 910 is employed and a ranked list 912 of people, files, binaries and functions related to the seed set is retrieved. Probabilistic inference using factor graphs provides a way to do the foregoing link analysis over large relationship graphs and obtain a ranked list of people, bugs, binaries, and functions that are most closely related to the seeds.

Figure 10A:
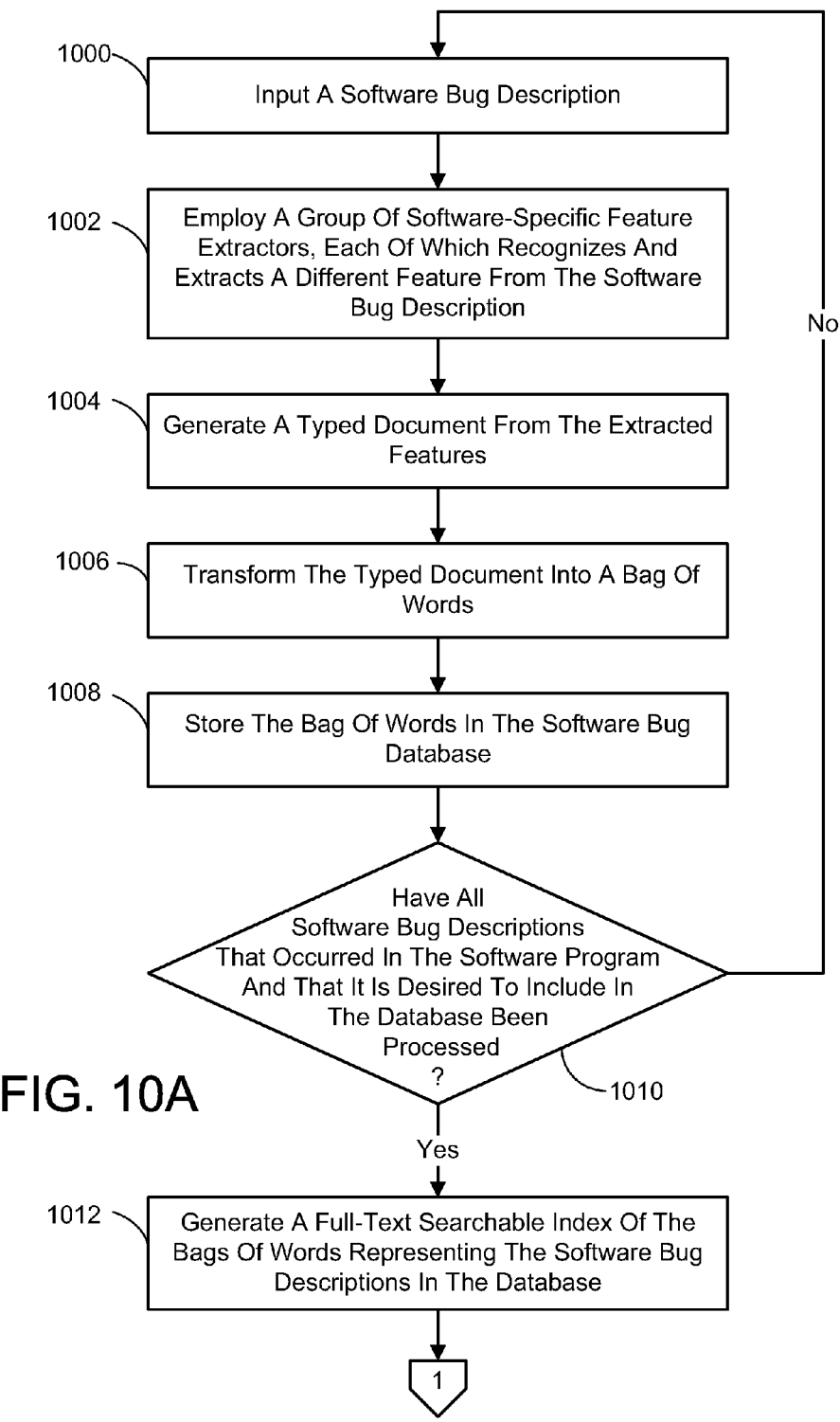
FIGS. 10A-B depict a flow diagram that generally outlines one implementation of a computer-implemented process for retrieving recommendations about people, source files, binaries, and source functions that are relevant to the current query.
Figure 10B:
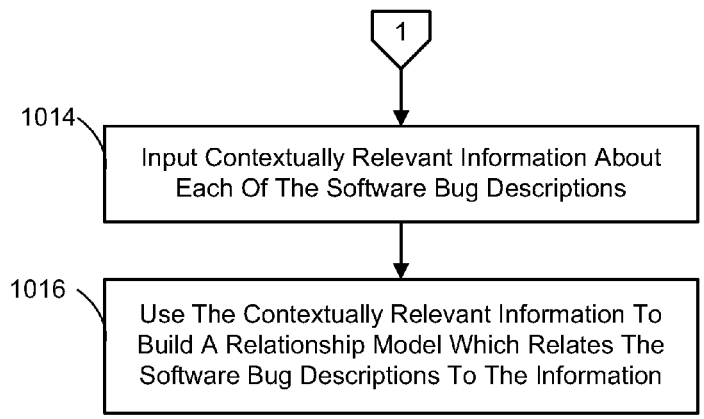

The foregoing database construction architecture can be realized in one implementation using the following process, as illustrated in FIGS. 10A-B. In this exemplary process, a computer (such as one of the computing devices described in the Computing Environment section provided later in this specification) is employed to perform a series of process actions including inputting a software bug description which provides information about a previously resolved or yet to be resolved software bug occurring in a software program of interest (1000). A group of software-specific feature extractors designed for the software program is then employed, where each extractor recognizes and extracts a different feature from the software bug description whenever the feature exists in the software bug description (1002). A typed document is generated from the features extracted by the feature extractors (1004), and then transformed into a bag of words (1006). The bag of words is stored in a software bug database (1008). It is next determined if all the software bug descriptions associated with previously resolved or yet to be resolved software bugs, or both, that occurred in the software program and that it is desired to include in the database, have been processed (1010). If not, then process actions (1000) through (1010) are repeated for each additional software bug description. Once all the software bug descriptions have been processed, a full-text searchable index of the bags of words representing the first-input and additional software bug descriptions in the database is generated (1012). In addition, contextually relevant information is input about each of the first-input and additional software bug descriptions (1014). This contextually relevant information is used to build a relationship model, which relates the first-input and additional software bug descriptions to the contextually relevant information (1016). As indicated previously, this contextually relevant information can include at least one of:

(i) the identity of a version control revision of the software that includes a change which resolved the software bug; or
(ii) the identity of a line or lines of code of the software program changed to resolve the software bug; or
(iii) the identity of a function or functions of the software program changed to resolve the software bug; or
(iv) the identity of a binary or binaries of the software program changed to resolve the software bug; or
(v) the identity of an entity or entities (e.g. person, company, group and so on) responsible for changing the software program to resolve the software bug associated with the software bug description; or
(vi) the identity of a document or documents pertaining to a resolution of the software bug associated with the software bug description (such as developer network pages, and so on).

Figure 11:
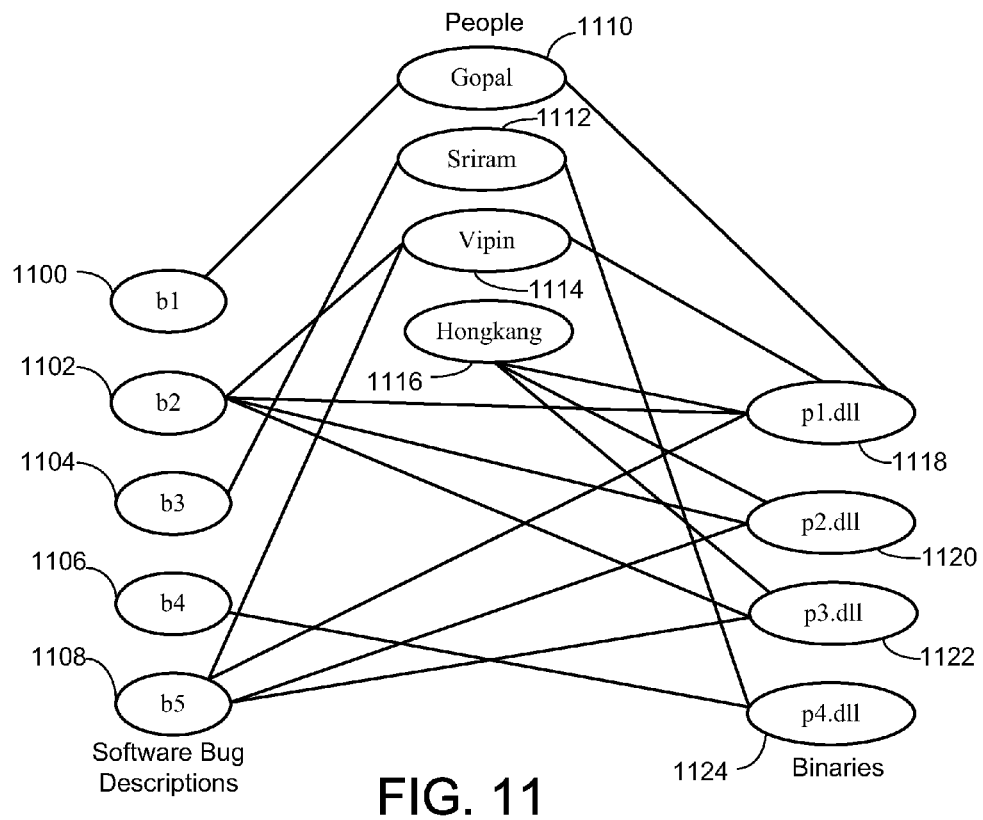
FIG. 11 is a diagram depicting a simplified example of a relationship graph.

In view of the foregoing, the results from the first phase can be thought as an "expansion" of the original query, and the second phase aims to leverage information from the expanded query to infer related entities. The benefit of this query expansion can be quite significant, because often the raw query (say just a stack trace from a machine being debugged) matches a set of related bugs and these bugs may have a number of explicit links to related entities. In this way, relationships can be found that can be used to resolve the query software bug. For example, consider the relationship graph shown in FIG. 11. In this graph, there are 5 software bug descriptions 1100-1108 (b1, b2, b3, b4 and b5, respectively); and 4 people 1110-1116 (Gopal, Sriram, Vipin and Hongkang, respectively); and 4 binaries 1118-1124 (p1.dll, p2.dll, p3.dll and p 4.dll, respectively). Now, suppose a set of bugs {b2, b5 } is returned from a query in the first phase. In the second phase these bugs are used as "seeds" to find people and binaries related to the bugs. Note that in the example of FIG. 11, the person Vipin 1114 is related to software bug descriptions b2 1102 and b5 1108, and that the binaries {p1.dll, p2.dll, p3.dll} 1118-1122 are related to {b2, b5}. Further, since Hongkang 1116 is related to the binaries {p1.dll, p2.dll, p3.dll} 1118-1122, it is possible to infer that Hongkang is related to the software bugs {b2, b5} 1102 and 1108 as well. Thus, {Vipin, Hongkang} 1114 and 1116 can be inferred to be a set of people related to the bugs {b2, b5} 1102 and 1108.

More particularly, the second phase of the software debugging recommendation technique embodiments described herein involves performing transitive closure on a relationship graph starting with the set of bugs found in the first phase in order to retrieve a ranked list or related entities. In one implementation, the relationship graph is a weighted multipartite graph $G=\langle V,E\rangle$, where the set V of vertices is partitioned into n mutually disjoint partitions $\{V_1, V_2, \ldots, V_n\}$, such that $E \subseteq V \times V \times Nat$ (where Nat is a natural number specifying the weight (i.e., strength) of the edge) contains only edges between two vertices in different partitions. That is, if $\langle s,t,w\rangle \in E$, and $s \in V_i$ and $t \in V_j$, then $i \neq j$. The third component of the edge w is a weight, a natural number, which is a measure of the relationship from s to t—the larger the weight, the tighter the relationship.

The vertices of the relationship graph have one partition $V_{bugs}$ for software bug descriptions (this includes bug reports as well as logs from interactive debugging sessions), one partition for $V_{files}$, one partition $V_{functions}$ for functions, and one partition $V_{people}$ for people.

Any appropriate relationship graph tool can be employed to build the aforementioned relationship graph. For example, an appropriate tool is the BCT relationship graph tool. This tool is used to build the relationship graph from various data repositories. For every resolved bug in the bug database, BCT looks for check-ins in source code version control that are associated with fixing the bug, and computes functions and source files that were changed to fix the bug, and the people who made those changes. BCT creates relationship links between these entities using such an analysis. The output of the first phase, $R_1$, is a set of software bug descriptions that are highly related to the query. That is $R_1 \subseteq V_{bugs}$. In the second phase $R_1$ is used as a starting point to perform link analysis on the relationship graph and compute a 4-tuple $R_2 = \langle v_{bugs}, v_{files}, v_{functions}, v_{people}\rangle$, where $v_{bugs} \subseteq V_{bugs}$, $v_{files} \subseteq V_{files}$, $v_{functions} \subseteq V_{functions}$, $v_{people} \subseteq V_{people}$.

The second phase attempts to identify vertices $R_2$ in the relationship graph that are most correlated with the vertices $R_1$ that are produced by the first phase. Formally, a relationship graph can be viewed as a Markov chain with $|V|$ vertices, and a $|V| \times |V|$ transition probability matrix each of whose entries lies in the interval [0, 1]. The transition probabilities are obtained by normalizing edge weights of the relationship graph such that the sum of the normalized edge weights going out of each vertex is 1. It is desired to compute the steady state probability distribution over the vertices of the Markov chain for a random walk starting at vertices $R_1$, and return the vertices with large steady state probabilities in each of the vertex partitions as the result $R_2$ of the second phase. In one implementation, factor graphs are used to compute these steady state probabilities. To this end, one Bernoulli random variable is associated with each vertex in V. The random variable for each element in $R_1$ is set to an initial distribution where the variable takes a value 1 with probability 0.9 and 0 with probability 0.1. All the other random variables (associated with vertices in $V \backslash R_1$) are set to have an initial distribution where the variable takes a value 1 with probability 0.5 and 0 with a probability 0.5. For every edge $e = \langle u,v,w\rangle$ which associates verities u and v with weight w, a factor $F_e$ (a probabilistic constraint) which constrains the joint probability distribution of the random variables $X_u$ and $X_v$ associated with u and v. The constraint $F_e$ states that $X_u$ and $X_v$ take the same value with probability p and different values with probability 1−p. The value of the parameter p depends on the weight w (normalized with the weights of other edges connected to u and v). Factor graph inference is then used to compute the posteriori probabilities of each random variable, and choose the random variables with highest posteriori probabilities for result set $R_2$.

2.0 The Computing Environment

A brief, general description of a suitable computing environment in which portions of the software debugging recommendation technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 12:
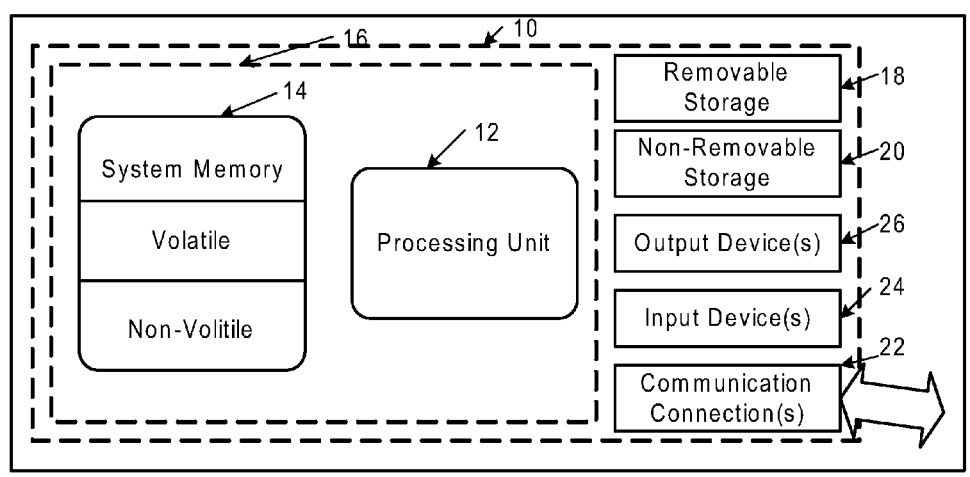
FIG. 12 is a diagram depicting a general purpose computing device constituting an exemplary system for implementing software debugging recommendation technique embodiments described herein.

FIG. 12 illustrates an example of a suitable computing system environment. The computing system environment is only one example of a suitable computing environment and is not intended to suggest any limitation as to the scope of use or functionality of software debugging recommendation technique embodiments described herein. Neither should the computing environment be interpreted as having any dependency or requirement relating to any one or combination of components illustrated in the exemplary operating environment. With reference to FIG. 12, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 12 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 12 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well know in the art and need not be discussed at length here.

The software debugging recommendation technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for creating a database of characterized software bug descriptions, comprising:
using a computer to perform the following process actions:
    (a) inputting a software bug description which provides information about a previously resolved or yet to be resolved software bug occurring in a software program, and which comprises more than the software code associated with a software bug;
    (b) employing a group of software-specific feature extractors designed for said software program, wherein each extractor recognizes and extracts a different feature from the software bug description, and wherein said software-specific feature extractors recognize and extract features which comprise more than the software code associated with the software bug;
    (c) generating a typed document comprising features extracted from the software bug description;
    (d) transforming the typed document into a bag of words, wherein order of the extracted features of the typed document in the bag of words is irrelevant and a bag of words having extracted features exhibiting a first order is equivalent to a bag of words having the same extracted features in a different order;
    (e) storing the bag of words in a database;
    (f) repeating actions (a)-(e) for a plurality of additional software bug descriptions associated with previously resolved or yet to be resolved software bugs, or both, that occurred in said software program; and
    (g) generating a full-text searchable index of the bags of words representing the first-input and additional software bug descriptions in the database.

2. The process of claim 1, wherein the process action of generating a typed document comprises generating a typed document wherein the extracted features are represented by one or more type constructors.

3. The process of claim 2, wherein each type constructor comprises one of an unordered bag of terms, or an ordered list of terms, or weighted terms, or key-value pairs.

4. The process of claim 1, wherein the process action of generating a full-text searchable index of the bags of words representing the first-input and additional software bug descriptions in the database, comprises the action of employing a Term Frequency and Inverse Document Frequency (TF-IDF) search engine to generate the index.

5. The process of claim 1, wherein said software bug descriptions each comprise structured and unstructured data.

6. The process of claim 5, wherein said structured and unstructured data comprises one or more of the following items: natural language text; or textual rendering of core dumps; or debugger output; or a state of the computer on which the software being debugged resides; or information in a current software bug report; or information obtained from a user's interaction with a debugger.

7. A computer-implemented process for providing software debugging recommendations, comprising:
  using a computer to perform the following process actions:
  inputting a software bug description query which provides information about a unresolved software bug occurring in a software program, and which comprises more than the software code associated with a software bug;
  employing a group of software-specific feature extractors designed for said software program, wherein each extractor recognizes and extracts a different feature from the software bug description query, and wherein said software-specific feature extractors recognize and extract features which comprise more than the software code associated with the software bug;
  generating a typed document comprising features extracted from the software bug description query;
  transforming the typed document into a bag of words, wherein order of the extracted features of the typed document in the bag of words is irrelevant and a bag of words having extracted features exhibiting a first order is equivalent to a bag of words having the same extracted features in a different order;
  searching an index associated with a database to identify one or more software bug descriptions deemed to be similar to a prescribed degree to the software bug description query, wherein each software bug description in the database comprises structured and unstructured data which provides information about a previously resolved or yet to be resolved software bug occurring in the software program associated with the software bug description query and which comprises more than the software code associated with a software bug, and each of which has been transformed into a bag of words in the same manner as the software bug description query; and
  producing a list of the identified software bug descriptions in the database that are deemed to be similar to the prescribed degree to the software bug description query.

8. The process of claim 7, further comprising the actions of:
  employing a group of custom rankers, wherein each ranker reviews each of the software bug descriptions named in the list of the identified software bug descriptions that are deemed to be similar to the prescribed degree to the software bug description query for instances of a different feature and ranking the descriptions based on the existence of said feature to produce a ranked list of said software bug descriptions;
  combining the ranked lists of software bug descriptions produced by the group of custom rankers to produce a single ranked list of the software bug descriptions;
  outputting the single ranked list of the software bug descriptions.

9. The process of claim 7, wherein the process action of searching an index associated with a database, comprises the action of employing a Term Frequency and Inverse Document Frequency (TF-IDF) search engine to perform the searching.

10. The process of claim 7, wherein said software bug description query comprises structured and unstructured data.

11. The process of claim 10, wherein said structured and unstructured data comprises one or more of the following items: natural language text; or textual rendering of core dumps; or debugger output; or a state of the computer on which the software being debugged resides; or information in a current software bug report; or information obtained from a user's interaction with a debugger.

12. The process of claim 10, wherein said structured and unstructured data associated with said software bug description query represents all the data available to a user concerning a current software bug.

13. A computer-implemented process for creating a database of characterized software bug descriptions and providing software debugging recommendations, comprising:
  using a computer to perform the following process actions:
  (a) inputting a software bug description comprising structured and unstructured data, which provides information about a previously resolved or yet to be resolved software bug occurring in a software program, and which comprises more than the software code associated with a software bug;
  (b) employing a group of software-specific feature extractors designed for said software program, wherein each extractor recognizes and extracts a different feature from the software bug description, and wherein said software-specific feature extractors recognize and extract features which comprise more than the software code associated with the software bug;
  (c) generating a typed document comprising features extracted from the software bug description;
  (d) transforming the typed document into a bag of words, wherein order of the extracted features of the typed document in the bag of words is irrelevant and a bag of words having extracted features exhibiting a first order is equivalent to a bag of words having the same extracted features in a different order;
  (e) storing the bag of words in a database;
  (f) repeating actions (a)-(e) for a plurality of additional software bug descriptions associated with previously resolved or yet to be resolved software bugs that occurred in said software program;
  (g) generating a full-text searchable index of the bags of words representing the first-input and additional software bug descriptions in the database;
  (h) inputting contextually relevant information about each of the first-input and additional software bug descriptions; and
  (i) building a relationship model which relates the first-input and additional software bug descriptions to said contextually relevant information.

14. The process of claim 13, wherein the contextually relevant information comprises for each resolved software bug description, at least one of:
  an identity of a version control revision of the software that includes a change which resolved the software bug associated with the software bug description; or
  an identity of a line or lines of code of the software program changed to resolve the software bug associated with the software bug description; or
  an identity of a function or functions of the software program changed to resolve the software bug associated with the software bug description; or an identity of a binary or binaries of the software program changed to resolve the software bug associated with the software bug description; or an identity of an entity or entities responsible for changing the software program to resolve the software bug associated with the software bug description; or an identity of a document or documents pertaining to a resolution of the software bug associated with the software bug description.

15. The process of claim 13, wherein the contextually relevant information comprises for each yet to be resolved software bug description, an identity of an entity or entities tasked to resolve the software bug associated with the software bug description.

16. The process of claim 13, further comprising the actions of:

inputting a software bug description query comprising structured and unstructured data, which provides information about a unresolved software bug occurring in said software program;

employing said group of software-specific feature extractors to recognize and extract features from the software bug description query;

generating a typed document comprising the features extracted from the software bug description query;

transforming the typed document into a bag of words;

searching an index associated with a database to identify one or more software bug descriptions deemed to be similar to a prescribed degree to the software bug description query; and outputting a list of the identified software bug descriptions in the database that are deemed to be similar to the prescribed degree to the software bug description query.

17. The process of claim 16, further comprising the actions of:

for each of the identified software bug descriptions in the database that are deemed to be similar to the prescribed degree to the software bug description query, performing a link analysis on the relationship model to identify contextually relevant information associated with the software bug description under consideration, and outputting the identified contextually relevant information associated with the software bug description under consideration.

18. The process of claim 17, wherein the relationship model is a weighted multipartite relationship graph, and wherein the process action of performing the link analysis on the relationship model, comprises an action of performing a random walk technique to identify associations between ones of items of the contextually relevant information and ones of the software bug descriptions that exceed a prescribed probability level based on the graph weights.

19. The process of claim 18, wherein association probabilities are computed using a factor graph method.

20. The process of claim 19, further comprising an action of ranking the identified associations based on the computed association probabilities.

\* \* \* \* \*